United States Patent
Tsuchiya

(10) Patent No.: US 10,500,996 B2
(45) Date of Patent: Dec. 10, 2019

(54) VEHICLE SEAT

(71) Applicant: TOYOTA BOSHOKU KABUSHIKI KAISHA, Aichi (JP)

(72) Inventor: Norimitsu Tsuchiya, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/962,343

(22) Filed: Apr. 25, 2018

(65) Prior Publication Data
US 2018/0334069 A1    Nov. 22, 2018

(30) Foreign Application Priority Data

May 22, 2017    (JP) ................. 2017-100873

(51) Int. Cl.
*B60N 2/75*    (2018.01)
*B60N 2/68*    (2006.01)

(52) U.S. Cl.
CPC ............. *B60N 2/757* (2018.02); *B60N 2/682* (2013.01); *B60N 2/767* (2018.02)

(58) Field of Classification Search
CPC ......... B60N 2/757; B60N 2/767; B60N 2/682
See application file for complete search history.

(56) References Cited

U.S. PATENT DOCUMENTS

| 5,246,267 A * | 9/1993 | Nagashima | B60N 2/757 297/113 |
| 5,752,739 A * | 5/1998 | Saeki | B60N 2/757 297/113 |
| 8,371,654 B2 * | 2/2013 | Senges | B60N 2/757 297/411.32 |
| 8,449,029 B2 * | 5/2013 | Runde | B60N 2/757 297/113 |
| 9,050,916 B2 * | 6/2015 | von Rothkirch und Panthen | B60N 2/43 |
| 2012/0223564 A1 * | 9/2012 | Andersson | B60N 2/787 297/411.3 |
| 2017/0305309 A1 * | 10/2017 | Akai | B60N 2/682 |
| 2018/0118069 A1 * | 5/2018 | Miyazaki | A47C 7/54 |

FOREIGN PATENT DOCUMENTS

JP    2016-78792    5/2016

* cited by examiner

*Primary Examiner* — Philip F Gabler
(74) *Attorney, Agent, or Firm* — Greenblum & Bernstein, P.L.C.

(57) ABSTRACT

A vehicle seat wherein debris can be inhibited from entering support brackets to which an armrest is coupled is provided. One aspect of the present disclosure provides a vehicle seat including a back frame and an armrest. The armrest includes side frames and a stopper pin. The back frame includes support brackets to which the side frames are pivotably coupled. The support brackets include guide slots that guide the stopper pin. On imaginary surfaces perpendicular to the seat width direction, loci of the guide slots formed on the side frames when the armrest pivots, the side frames and a portion of the stopper pin inserted into the guide slots are projected, and a diameter of a largest perfect circle that can be fitted into areas of the loci that do not overlap with the side frames and the stopper pin is smaller than widths of the guide slots.

7 Claims, 9 Drawing Sheets

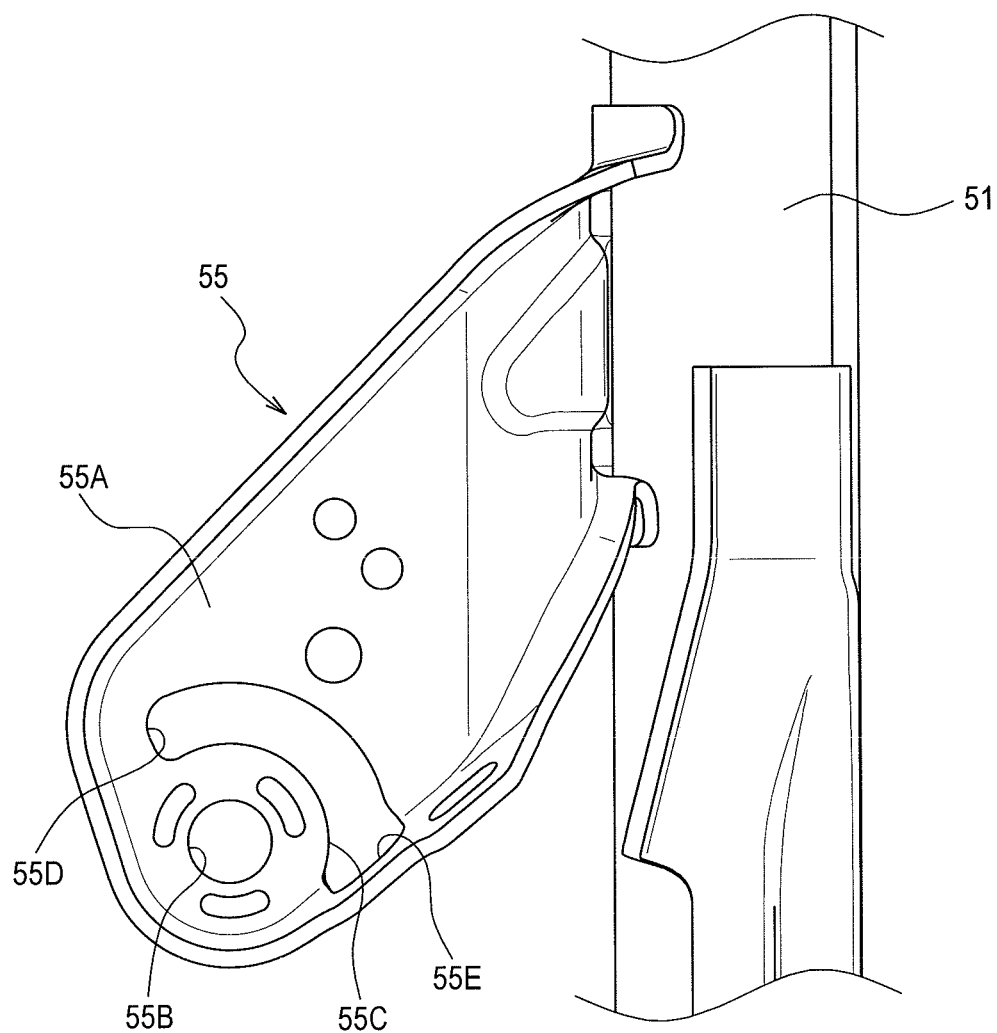
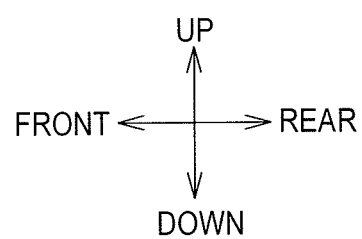
FIG. 6

VEHICLE SEAT

CROSS-REFERENCE TO RELATED APPLICATIONS

The present disclosure claims the benefit of Japanese Patent Application No. 2017-100873 filed on May 22, 2017 with the Japan Patent Office, the entire disclosure of which is incorporated herein by reference.

BACKGROUND

The present disclosure relates to a vehicle seat.

A vehicle seat used as a rear seat of an automobile, for example, is provided with an armrest that is pivotable between a stored position where the armrest is stored in a seatback and an in-use position where the armrest is folded down toward the front side of the seat.

Two side frames of the armrest are pivotably coupled to support brackets of a back frame forming the framework of a seatback. On the support brackets, guide slots are formed so as to guide a stopper pin, secured to the side frames of the armrest, when the armrest pivots.

In such a structure of the armrest, debris tends to enter the guide slots formed on the support brackets. To prevent debris from entering the guide slots, in Japanese Unexamined Patent Application Publication No. 2016-78792, for example, protection members are provided in the joining portions between the armrest and the support brackets so as to fill the gaps extending in the axial direction.

SUMMARY

However, the protection members need to have a certain size so as to fill the gaps between the armrest and the support brackets. Adding such protection members inevitably increases the cost and the weight of the components.

It is preferable that one aspect of the present disclosure provides a vehicle seat in which debris are inhibited from entering support brackets to which an armrest is coupled, while an increase in cost and weight of its components is inhibited.

One aspect of the present disclosure provides a vehicle seat comprising a seatback, a back frame forming a framework of the seatback, and an armrest configured to be pivotable between a stored position in which the armrest is stored in the seatback and an in-use position in which the armrest is folded down toward a front side of the seat. The armrest comprises two side frames disposed so as to be spaced apart in a seat width direction, and a stopper pin projecting outside from the two side frames in the seat width direction. The back frame comprises two support brackets to which the two side frames are respectively pivotably coupled. The two support brackets respectively comprise guide slots in which the stopper pin is inserted, the guide slots being configured to guide the stopper pin when the armrest pivots. On an imaginary surface that is perpendicular to the seat width direction and defined for each of the two side frames, a locus of one of the guide slots of a corresponding one of the two support brackets, a corresponding one of the two side frames, and a portion of the stopper pin inserted into the guide slots are projected. The locus is formed on the corresponding one of the two side frames when the armrest pivots. A diameter of a largest perfect circle that can be fitted into areas of the locus that do not overlap with the corresponding one of the two side frames and the stopper pin is smaller than a width of the one of the guide slots.

Due to this structure, the loci of the guide slots are respectively covered by the lateral surfaces of the side frames (that is, surfaces perpendicular to the seat width direction), and the widths and the lengths of the uncovered portions of the loci of the guide slots are smaller than the widths of the guide slots. This structure therefore inhibits debris that are larger than the widths of the guide slots from entering the guide slots in the portions of the guide slots that are not covered by the side frames.

In other words, according to the present disclosure, by adjusting the shapes of the lateral surfaces of side frames, debris can be inhibited from entering the support brackets to which the armrest is coupled, while an increase in cost and weight of the components can be inhibited.

According to one aspect of the present disclosure, at least one of the two side frames may comprise a panel-like main body and an auxiliary bracket attached to the main body. The auxiliary bracket may be disposed in a portion of the imaginary surface where the auxiliary bracket overlaps with the locus. Due to this structure, the shapes of the lateral surfaces of the side frames can be relatively easily adjusted. The auxiliary brackets are only required to respectively overlap with some portions of the loci of the guide slots, which allows the auxiliary brackets to be formed smaller than the protection members according to the aforementioned conventional technique. This structure inhibits an increase in cost and weight of the components.

According to one aspect of the present disclosure, the main body may comprise a lateral surface perpendicular to the seat width direction, and an upper surface coupled to the lateral surface in an upper side of the armrest in the in-use position. The stopper pin may be secured to the upper surface of the main body. The auxiliary bracket may be disposed on the upper surfaces of the main body so as to cover the stopper pin. Due to this structure, the sizes of the auxiliary brackets can be minimized. As a result, the cost and the weight of the components can be reduced.

According to one aspect of the present disclosure, an entire portion of the locus may overlap with at least one of the corresponding one of the two side frames and the stopper pin on the imaginary surface. This structure more reliably inhibits debris from entering the guide slots.

BRIEF DESCRIPTION OF THE DRAWINGS

An example embodiment of the present disclosure will be described hereinafter by way of example with reference to the accompanying drawings, in which:

FIG. 6 is a partially enlarged view schematically showing a first support bracket of the back frame in FIG. 5;

DETAILED DESCRIPTION OF THE PREFERRED EMBODIMENTS

1. First Embodiment

[1-1. Structure]

Figure 1:
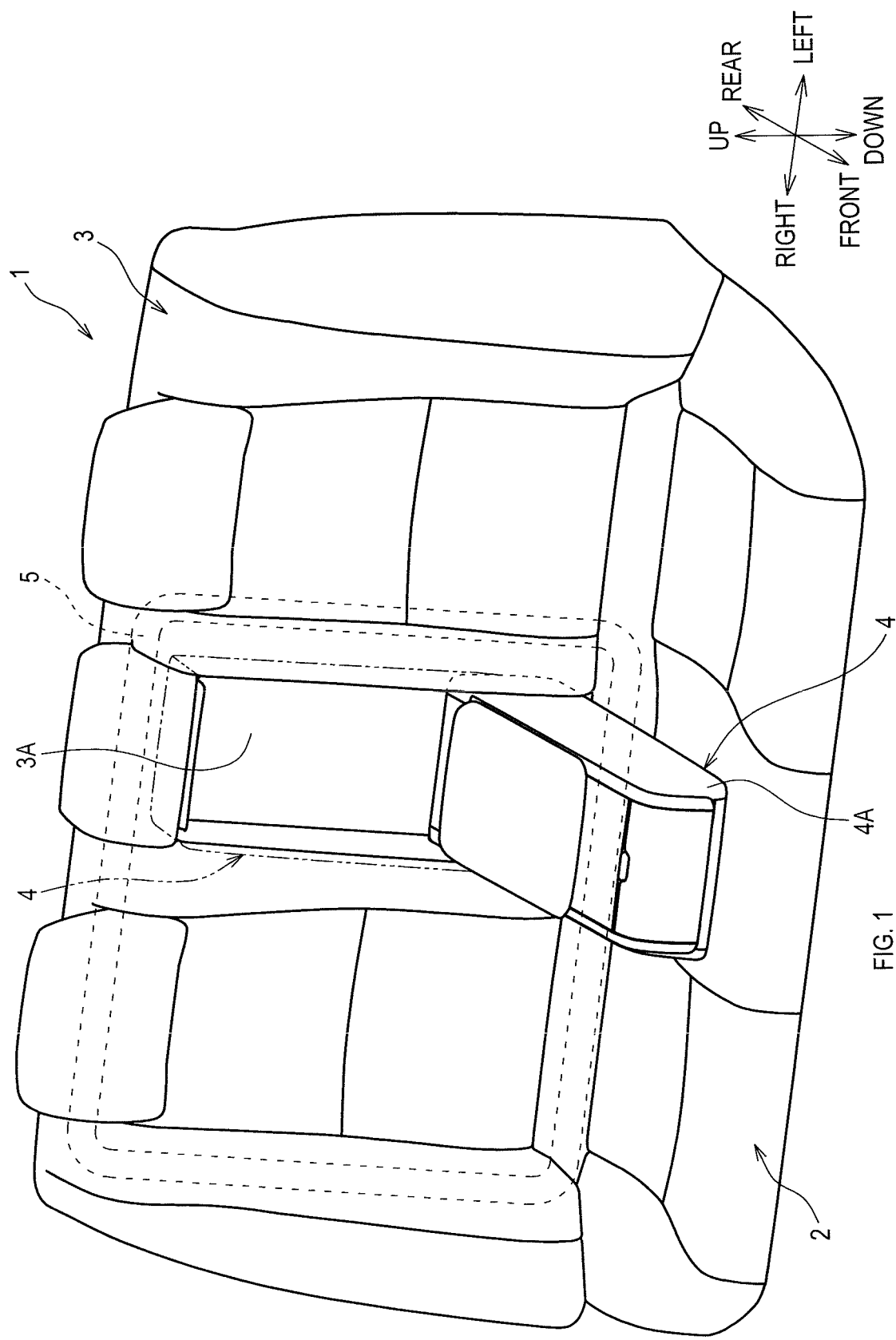
FIG. 1 is a schematic perspective view showing a vehicle seat according to an embodiment of the present disclosure.

A vehicle seat 1 shown in FIG. 1 comprises a seat cushion 2, a seatback 3, an armrest 4, and a back frame 5.

The seat cushion 2 is configured to support, for example, the buttocks of an occupant. The seatback 3 is configured to support the back of the occupant. The armrest 4 forms an armrest and so on for the occupant. The back frame 5 forms the framework of the seatback 3.

The vehicle seat 1 according to the present embodiment is used as a rear seat of a passenger car. In the following description and the drawings, the directions are defined in relation to the vehicle seat 1 assembled in a vehicle (for example, in an automobile). The seat width direction in the present embodiment corresponds to the left-right direction of the vehicle, and the front side of the vehicle seat 1 corresponds to the front side of the vehicle.

<Armrest>

The armrest 4 is configured to be pivotable between a stored position in which the armrest 4 is stored vertically in a recess 3A of the seatback 3 as shown with double dot-and-dash lines in FIG. 1, and an in-use position in which the armrest 4 is folded down horizontally toward the front side of the vehicle seat 1 as shown with solid lines in FIG. 1.

Figure 2:
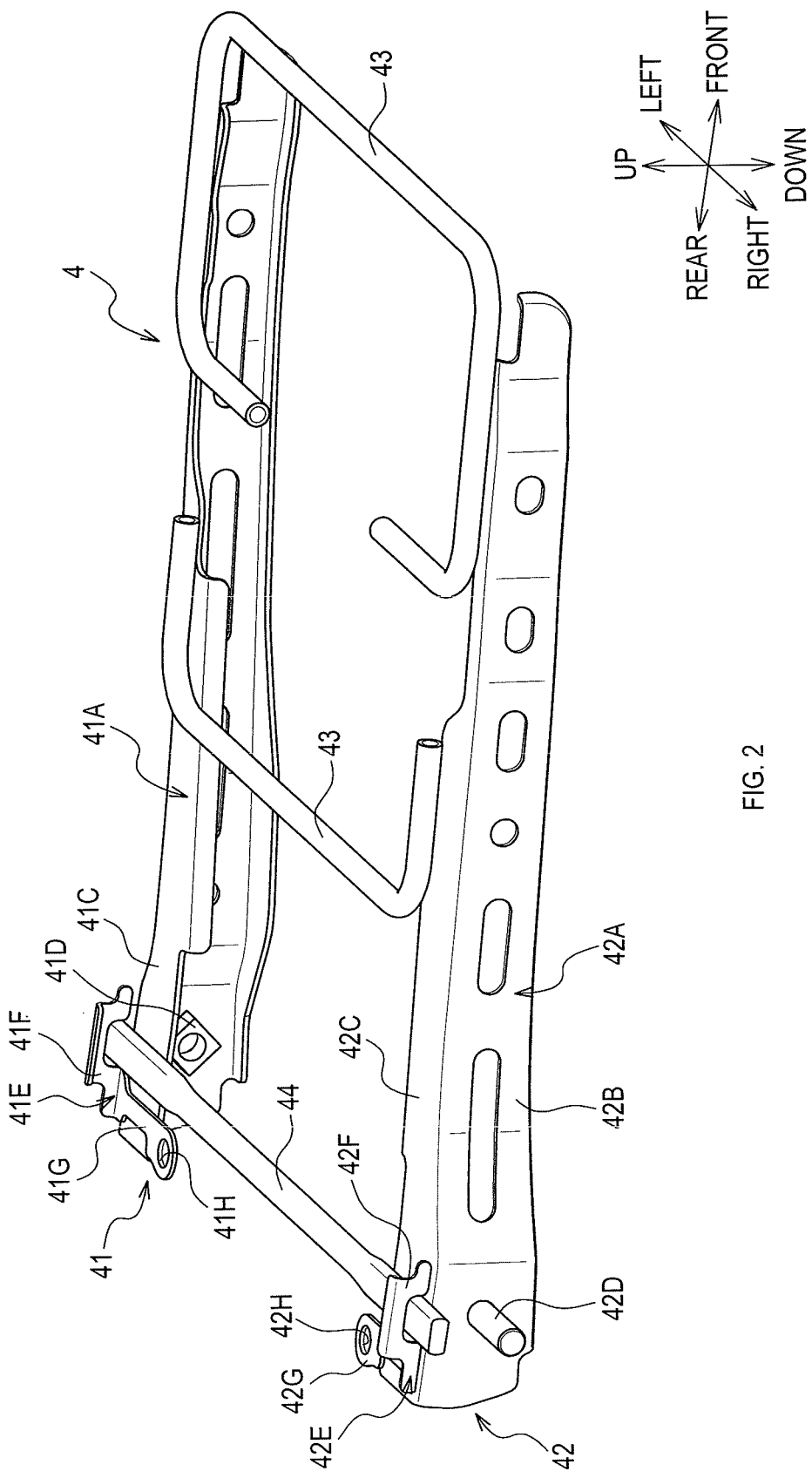
FIG. 2 is a schematic perspective view showing an armrest of the vehicle seat in FIG. 1.
Figure 3:
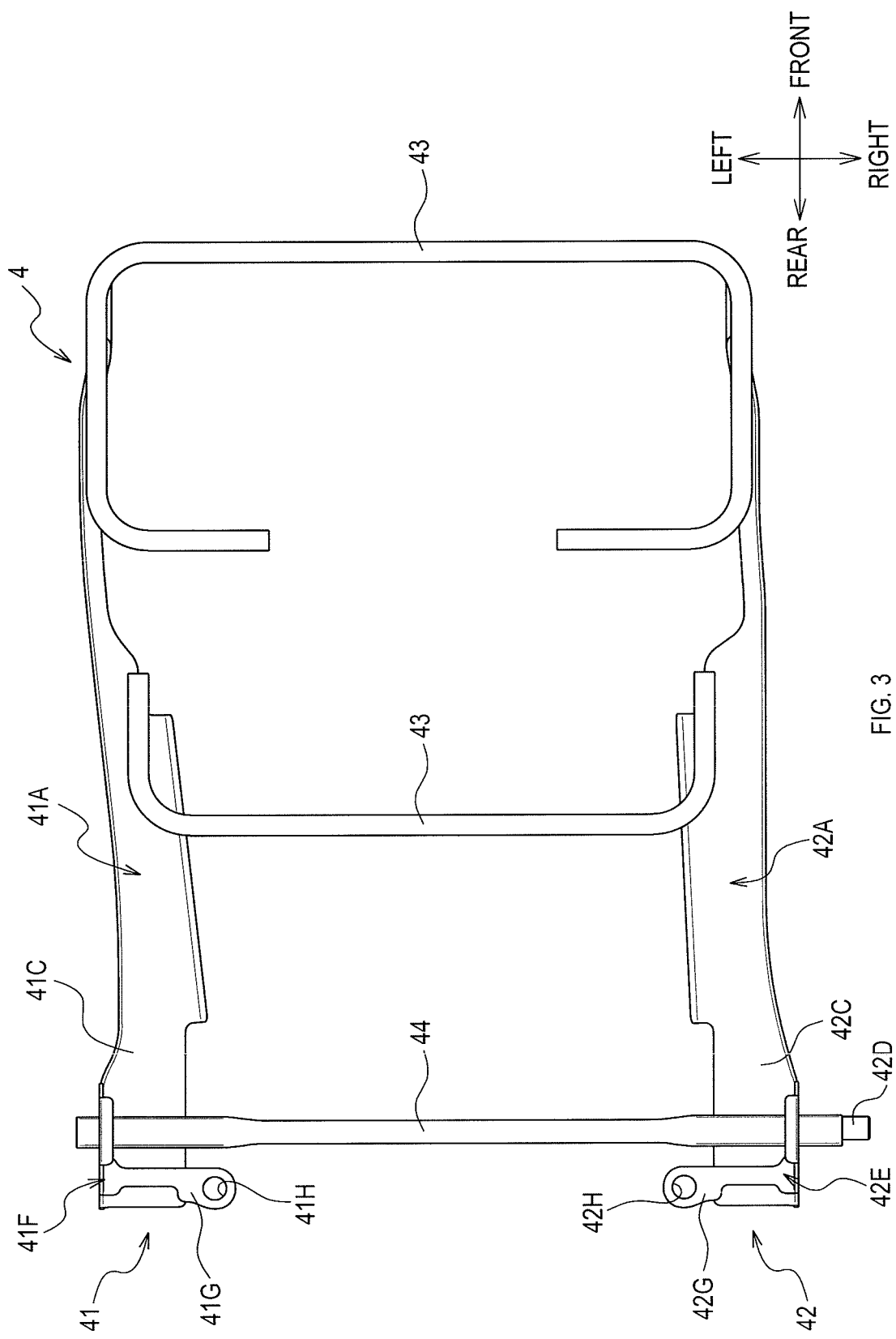
FIG. 3 is a schematic plan view showing the armrest in FIG. 2 from above.
Figure 4:
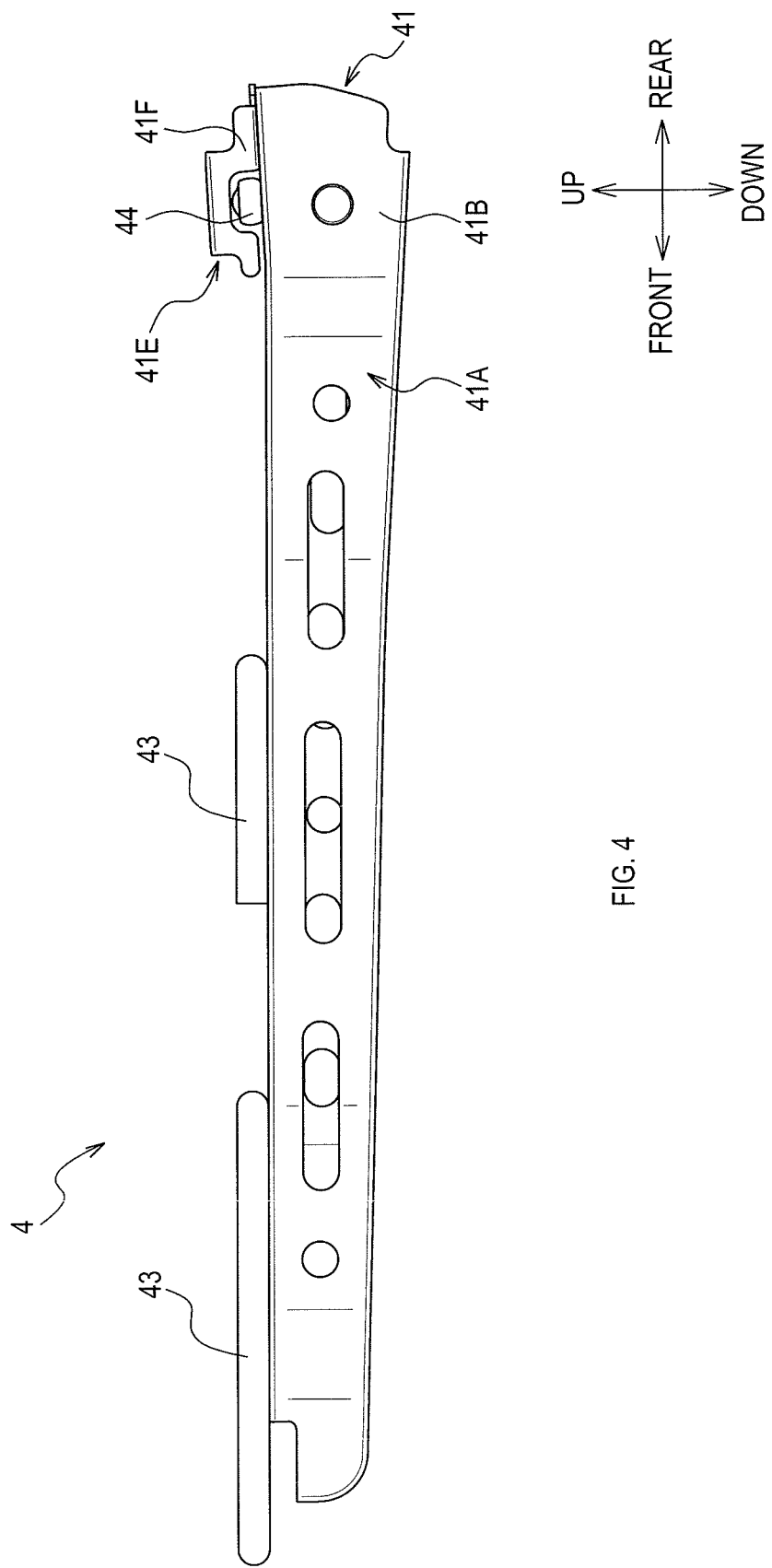
FIG. 4 is a schematic side view showing the armrest in FIG. 2 from the left side.

As shown in FIGS. 1 to 4, the armrest 4 comprises a cover 4A, a first side frame 41, a second side frame 42, joining portions 43, and a stopper pin 44. FIGS. 2 to 4 show the armrest 4 in the in-use position. FIGS. 2 to 4 do not show the cover 4A.

<<Side Frame>>

The first side frame 41 in the left side extends in the front-rear direction of the armrest 4 in the in-use position.

The first side frame 41 comprises a panel-like main body 41A and an auxiliary bracket 41E attached to the main body 41A.

As shown in FIGS. 2 and 4, the main body 41A comprises a lateral surface 41B, an upper surface 41C, and a bolt inserting portion 41D.

The lateral surface 41B extends perpendicular to the seat width direction (in the left-right direction in the present embodiment). The upper surface 41C is coupled in the upper side of the lateral surface 41B when the armrest 4 is in the in-use position.

The bolt inserting portion 41D comprises a through hole penetrating the lateral surface 41B. Into the bolt inserting portion 41D, a bolt that penetrates a bolt inserting hole 55B of a first support bracket 55 of a back frame 5, which will be described below, is inserted. This structure allows the first side frame 41 to be pivotably coupled to the first support bracket 55.

As shown in FIG. 2, the auxiliary bracket 41E is a planar member and comprises a side wall portion 41F, a secured portion 41G, and a through hole 41H.

The side wall portion 41F is a planar portion and is thick in the seat width direction. The side wall portion 41F extends in the front-rear direction of the armrest 4 in the in-use position. The intermediate portion of the side wall portion 41F is provided with a recess that is an upward cut-out from the lower end of the side wall portion 41F. The side wall portion 41F is disposed on the main body 41A. The stopper pin 44, which will be described below, is inserted into the recess of the side wall portion 41F.

The secured portion 41G is a planar portion coupled to the lower end of the side wall portion 41F and extending in the seat width direction. The secured portion 41G is secured to the upper surface 41C of the main body 41A by welding. The secured portion 41G is secured in the rear end portion of the main body 41A behind the stopper pin 44. The secured portion 41G is provided with the through hole 41H for positioning.

The second side frame 42 in the right side is disposed so as to face the first side frame 41 and to be spaced apart from the first side frame 41 in the seat width direction.

The second side frame 42 comprises a panel-like main body 42A and an auxiliary bracket 42E attached to the main body 42A.

The main body 42A of the second side frame 42 comprises a lateral surface 42B, an upper surface 42C, and a fixed pin 42D. The main body 42A of the second side frame 42 is substantially mirror image of the main body 41A of the first side frame 41 except for some details, and is provided with the fixed pin 42D instead of the bolt inserting portion 41D, as shown in FIG. 2.

The fixed pin 42D is a columnar member that outwardly projects rightward from the lateral surface 42B in the seat width direction. The fixed pin 42D is inserted into a pin inserting hole 56B (see FIG. 7) of a second support bracket 56 (see FIG. 5) of the back frame 5, which will be described below, and serves as a pivot axis of the armrest 4 relative to the back frame 5.

The auxiliary bracket 42E comprises a side wall portion 42F, a secured portion 42G, and a through hole 42H. The auxiliary bracket 42E of the second side frame 42 is a mirror image of the auxiliary bracket 41E of the first side frame 41.

<<Joining Portion>>

The joining portions 43 are pipe or wire members. The joining portions 43 couple the first side frame 41 and the second side frame 42 in the seat width direction.

<<Stopper Pin>>

The stopper pin 44 is a rod-like member that projects leftwardly outside from the first side frame 41, and projects rightwardly outside from the second side frame 42 in the seat width direction of the armrest 4, see FIG. 2.

As shown in FIGS. 2 and 3, the stopper pin 44 extends in the seat width direction and secured to the upper surface 41C of the main body 41A of the first side frame 41 and the upper surface 42C of the main body 42A of the second side frame 42 by welding.

The stopper pin 44 is secured in the rear end portions of the main bodies 41A, 42A in front of the auxiliary bracket 41E of the first side frame 41 and the auxiliary bracket 42E of the second side frame 42. The stopper pin 44 penetrates the recesses of the auxiliary brackets 41E, 42E. In other words, the auxiliary brackets 41E, 42E are disposed on the upper surfaces 41C, 42C of the main bodies 41A, 42A so as to cover the stopper pin 44.

The cross-sections of the stopper pin 44 at its both ends are preferably substantially rectangular shapes. Specifically, the cross-sections of the stopper pin 44 at its both ends are rectangular shapes with two semi-hemispherical chamfered sides. The stopper pin 44 is secured to the side frames 41, 42 on one of the surfaces forming the long side of the cross-section. It should be noted, however, that the shapes of the cross-sections of the stopper pin 44 at its both ends are not limited to the rectangular shapes.

<Back Frame>

Figure 5:
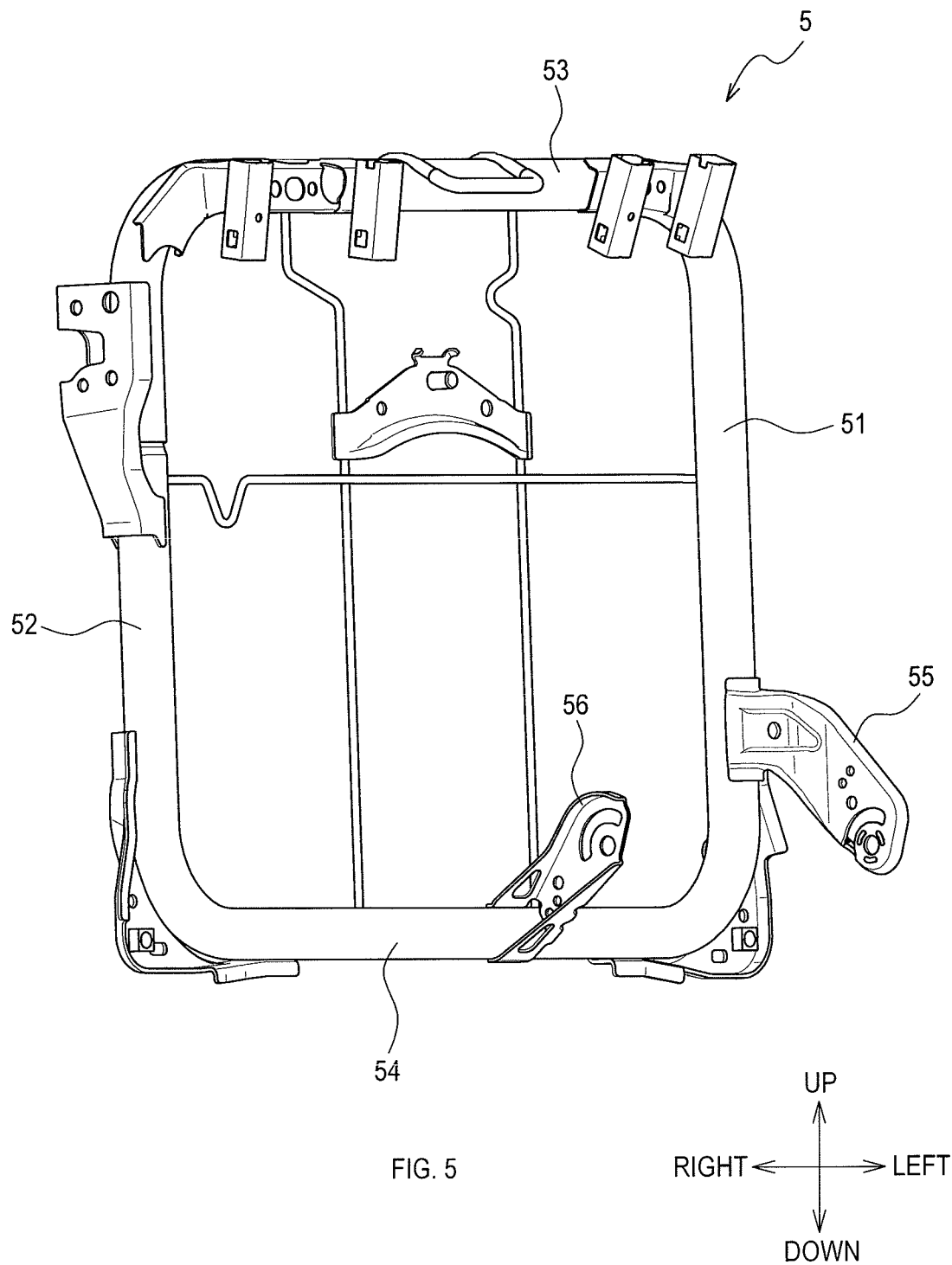
FIG. 5 is a schematic perspective view showing a back frame of the vehicle seat in FIG. 1.

As shown in FIG. 5, the back frame 5 comprises a first side frame 51, a second side frame 52, an upper frame 53, a lower frame 54, and two support brackets 55, 56 (first support bracket 55 and second support bracket 56).

<<Side Frame>>

The first and the second side frames 51, 52 are pipe or wire members extending in the up-down direction and disposed so as to be spaced apart in the seat width direction.

<<Upper Frame and Lower Frame>>

The upper frame 53 is a pipe or wire member extending in the seat width direction and couples the upper end of the side frames 51, 52.

The lower frame 54 is a pipe or wire member extending in the seat width direction and couples the lower ends of the first and the second side frames 51, 52.

The upper frame 53 and the lower frame 54 may be panel-like members having cross-sections orthogonal to their extending directions formed into, for example, a letter C or J like shape.

<<Support Bracket>>

The first support bracket 55 in the left side is a member to which the first side frame 41 of the armrest 4 is pivotably coupled via a bolt (not shown).

As shown in FIG. 6, the first support bracket 55 comprises a main body 55A, the bolt inserting hole 55B, and a guide slot 55C.

The main body 55A is a planar member extending in the front-rear direction and in the up-down direction of the vehicle seat 1 (in other words, a plane orthogonal to the width direction). The rear end of the main body 55A is attached to the first side frame 51 of the back frame 5 in the left side. The front end portion of the main body 55A is located in front of and lower than the rear end of the main body 55A. In the front end portion of the main body 55A, the bolt inserting hole 55B and the guide slot 55C are provided.

Into the bolt inserting hole 55B, a bolt (not shown) that serves as the pivot axis of the armrest 4 relative to the back frame 5 is inserted. This bolt (not shown) is further inserted into the bolt inserting portion 41D of the first side frame 41.

Into the guide slot 55C, the left tip of the stopper pin 44 of the armrest 4 is inserted. The guide slot 55C pivotably guides the stopper pin 44 when the armrest 4 pivots, and prevents the armrest 4 from rotating downward beyond an approximately horizontal position. In other words, the guide slot 55C is configured to align with the locus of the stopper pin 44 when the armrest 4 pivots between the stored position and the in-use position.

A front end portion 55D of the guide slot 55C located toward the front side of the vehicle seat 1 limits the pivot movement of the armrest 4 when the armrest 4 pivots to the in-use position due to the stopper pin 44 touching the front end portion 55D. In other words, when the armrest 4 is in the in-use position, the stopper pin 44 abuts on the front end portion 55D of the guide slot 55C.

The guide slot 55C of the first support bracket 55 in the present embodiment is an opening provided to the main body 55A. The main body 55A is configured such that the lower end portion thereof is curved so as to extend in the seat width direction, and a rear end portion 55E of the guide slot 55C located in the opposite side of the front end portion 55D extends up to the curved lower end portion of the guide slot 55C. Accordingly, the stopper pin 44 can be vertically inserted into or removed from the rear end portion 55E of the guide slot 55C after the fixed pin 42D has been (slightly diagonally) inserted into the pin inserting hole 56B.

The second support bracket 56 in the right side is a member to which the second side frame 42 of the armrest 4 is pivotably coupled. As shown in FIG. 5, the second support bracket 56 is disposed so as to face the first support bracket 55 and to be spaced apart from the first support bracket 55 in the seat width direction.

Figure 7:
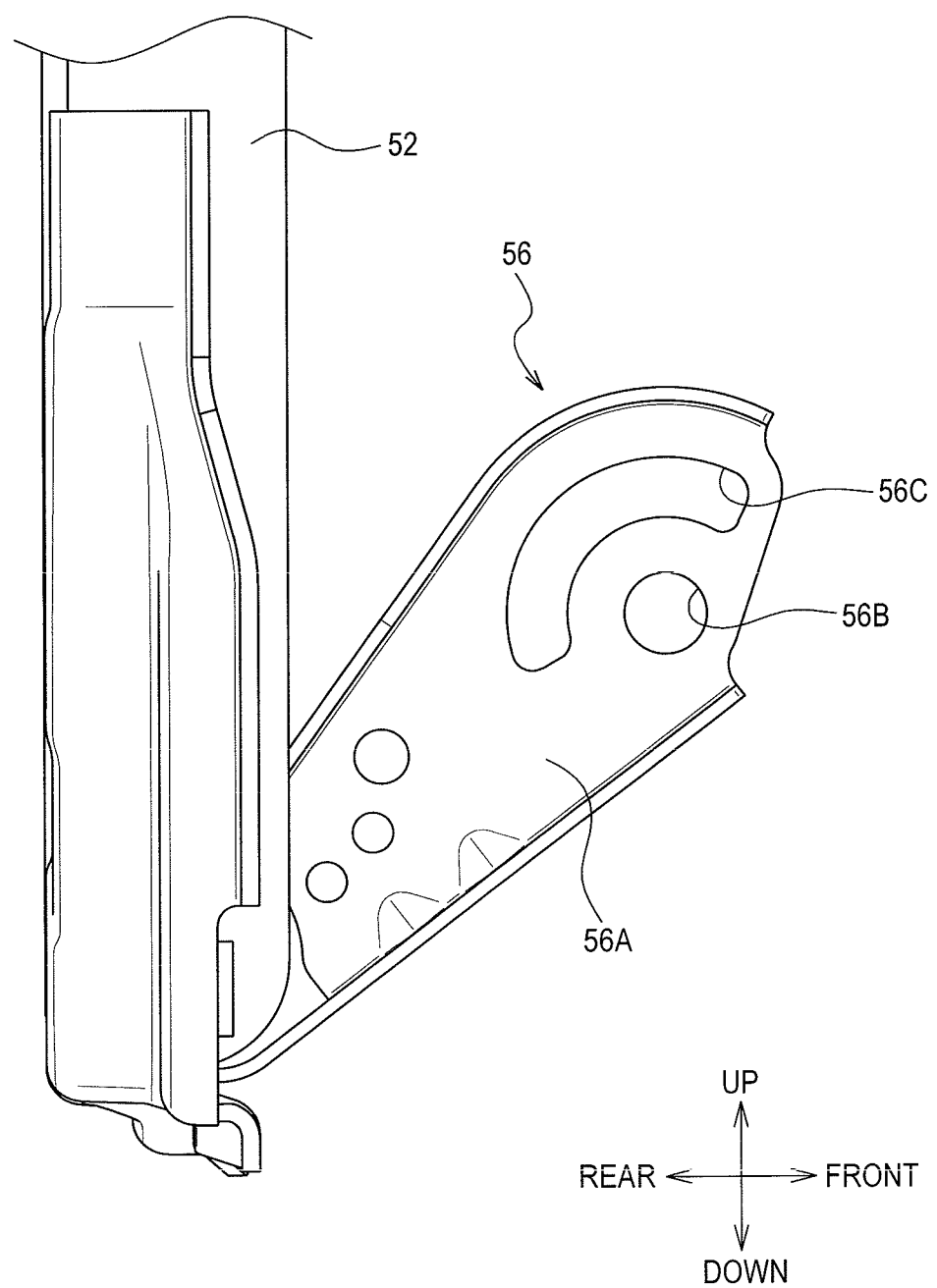
FIG. 7 is a partially enlarged view schematically showing a second support bracket of the back frame in FIG. 5.

As shown in FIG. 7, the second support bracket 56 comprises a main body 56A, the pin inserting hole 56B, and a guide slot 56C.

The main body 56A is a planar member extending in the front-rear direction and in the up-down direction of the vehicle seat 1. As shown in FIG. 5, the rear end portion of the main body 56A is attached to the lower frame 54 of the back frame 5. The front end portion of the main body 56A is located in front of and higher than the rear end portion of the main body 56A. In the front end portion of the main body 56A, the pin inserting hole 56B and the guide slot 56C are provided.

Into the pin inserting hole 56B, the fixed pin 42D of the second side frame 42 is inserted. The fixed pin 42D forms, together with the bolt (not shown) inserted into the bolt inserting hole 55B of the first support bracket 55, the pivot axis of the armrest 4 relative to the back frame 5.

Into the guide slot 56C, the right tip of the stopper pin 44 of the armrest 4 is inserted. The guide slot 56C guides the stopper pin 44 in a similar manner as the guide slot 55C of the first support bracket 5 when the armrest 4 pivots.

For this purpose, the guide slot 56C of the second support bracket 56 has a substantially mirror image shape relative to the guide slot 55C of the first support bracket 55. Nevertheless, the rear end portion of the guide slot 56C of the second support bracket 56 does not extend to the lower end portion of the main body 56A and, differently from the guide slot 55C of the first support bracket 55, the guide slot 56C does not have any area which the stopper pin 44 can be vertically inserted or removed.

<Relation between Side Frames of Armrest and Guide Slots>

The following describes the positional relation between the first and the second side frames 41, 42 and the guide slots 55C, 56C while the first and the second side frames 41, 42 of the armrest 4 are respectively coupled to the first and the second support brackets 55, 56.

Figure 8:
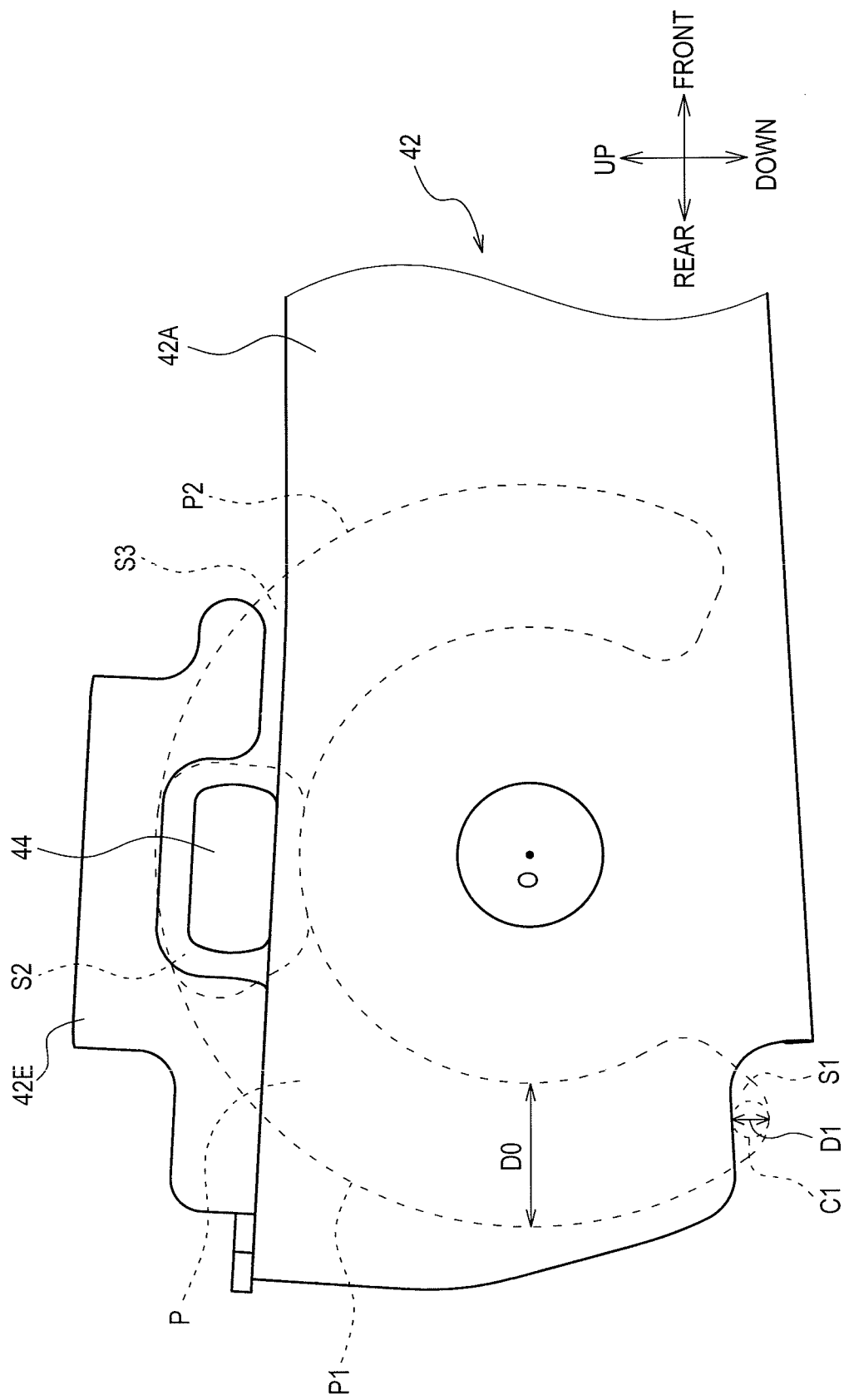
FIG. 8 is a schematic view showing a side frame, a stopper pin, and a guide slot projected on an imaginary surface.

FIG. 8 is a projection view showing an imaginary surface perpendicular to the seat width direction (that is, perpendicular to a direction parallel to the pivot axis). Projected on the imaginary surface are a locus P of the guide slot 56C of the second support bracket 56 corresponding to the second side frame 42, the second side frame 42, and a portion of the stopper pin 44 inserted into the guide slot 56C (that is, the cross-section of the tip portion of the stopper pin 44). The locus P is formed on the second side frame 42 when the armrest 4 pivots.

As shown in FIG. 8, the locus P is formed by joining an area P1 that aligns with the guide slot 56C when the armrest 4 in the in-use position, and an area P2 that aligns with the guide slot 56C when the armrest 4 is in the stored position.

In FIG. 8, the diameter of the largest perfect circle that can be fitted into areas S1, S2, S3 (first area S1, second area S2, and third area S3) of the locus P that do not overlap with the second side frame 42 and the stopper pin 44 is smaller than the width D0 of the guide slot 56C. The auxiliary bracket 42E is disposed in a portion of the imaginary surface where the auxiliary bracket 42E overlaps with the locus P of the guide slot 56C.

"The width of the guide slot" means that the length of the guide slot in a direction perpendicular to the direction of the movement of the stopper pin 44 in the guide slot, that is, the length of the guide slot in the radius direction around the pivot axis O of the armrest 4.

For example, in the area S1 of the locus P located beyond the rear lower end of the main body 42A of the second side frame 42, a circle C1 shown in the drawing is the largest perfect circle that can be fitted therein. Accordingly, the diameter of the largest perfect circle that can be fitted into the area S1 is the diameter D1 of the circle C1. The diameter D1 is smaller than the width D0 of the guide slot 56C.

Figure 9:
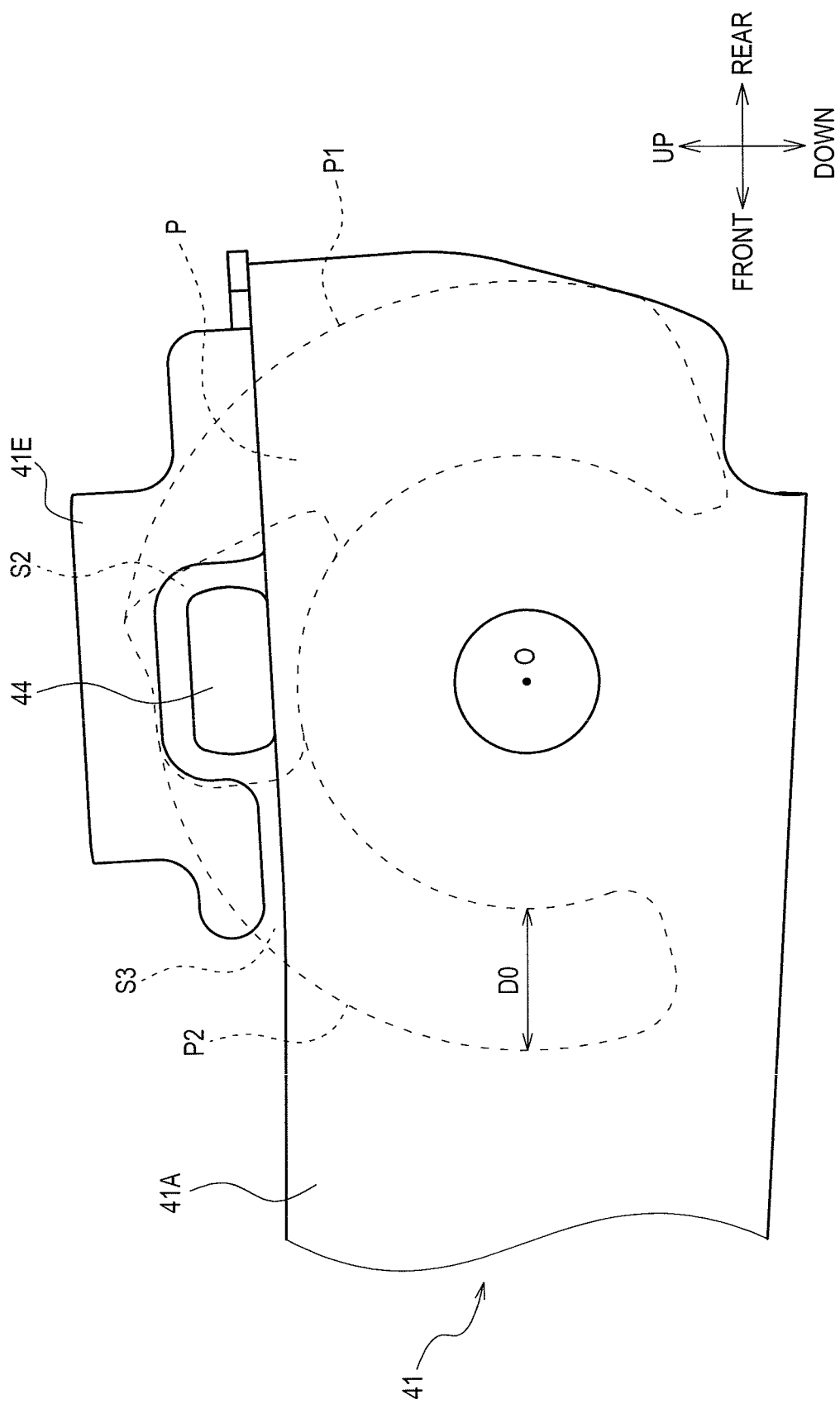
FIG. 9 is a schematic view showing another side frame, the stopper pin, and another guide slot projected on another imaginary surface.

FIG. 9 is a projection view showing another imaginary surface perpendicular to the seat width direction. Projected on the imaginary surface are a locus P of the guide slot 55C of the first support bracket 55 corresponding to the first side frame 41, the first side frame 41, and a portion of the stopper pin 44 inserted into the guide slot 55C. The locus P is formed on the first side frame 41 when the armrest 4 pivots.

In FIG. 9, the diameter of the largest perfect circle that can be fitted into areas S2, S3 of the locus P of the guide slot 55C that do not overlap with the first side frame 41 and the stopper pin 44 is smaller than the width D0 of the guide slot 55C. The auxiliary bracket 41E is disposed in a portion of the imaginary surface where the auxiliary bracket 41E overlaps with the locus P of the guide slot 55C.

From the loci P of the guide slots 55C, 56C, the areas S1, S2, S3 that do not overlap with the second side frames 41, 42 and the stopper pin 44 may be removed. In other words, on the aforementioned imaginary surfaces, the entire portions of the loci P of the guide slots 55C, 56C may respectively overlap with the corresponding side frames 41, 42 or the stopper pin 44. This structure more reliably inhibits debris from entering the guide slots 55C, 56C.

[1-2. Effect]

The following effect can be achieved according to the above-described embodiment.

(1a) The loci P of the guide slots 55C, 56C are respectively covered by the lateral surfaces of the side frames 41, 42, and the widths and the lengths of the uncovered portions (e.g., D1 of S1) of the loci P of the guide slots 55C, 56C are smaller than the widths of the guide slots 55C, 56C. This structure inhibits debris that are larger than the widths of the guide slots 55C, 56C from entering the portions of the guide slots 55C, 56C that are not covered by the side frames 41, 42.

In other words, according to the present disclosure, by adjusting the shapes of the lateral surfaces of side frames 41, 42, debris can be inhibited from entering the support brackets 55, 56 to which the armrest 4 is coupled, while an increase in cost and weight of the components can be inhibited.

(1b) By disposing the auxiliary brackets 41E, 42E in some portions of the imaginary surfaces where the auxiliary brackets 41E, 42E respectively overlap with the loci P of the guide slots 55C, 56C, the shapes of the lateral surfaces of the side frames 41, 42 can be relatively easily adjusted to block debris from entering the guide slots.

(1c) Since the auxiliary brackets 41E, 42E are respectively disposed on the upper surfaces 41C, 42C of the main bodies 41A, 42A so as to cover the stopper pin 44, the sizes of the auxiliary brackets 41E, 42E can be minimized. As a result, the cost and the weight of the components can be reduced.

2. Other Embodiments

The above has described an embodiment of the present disclosure. The present disclosure, however, is not limited to the aforementioned embodiment and may be carried out in various forms.

(2a) In the vehicle seat 1 according to the aforementioned embodiment, the side frames 41, 42 do not have to have the auxiliary brackets 41E, 42E. In other words, the side frames 41, 42 may respectively cover the loci P of the guide slots 55C, 56C only by the lateral surfaces 41B, 42B of the main bodies 41A, 42A and the stopper pin 44.

(2b) In the vehicle seat 1 according to the aforementioned embodiment, the shapes of the side frames 41, 42 respectively including the auxiliary brackets 41E, 42E are merely one example. The shapes of the auxiliary brackets 41E, 42E can be optionally modified and, for example, the auxiliary brackets 41E, 42E do not have to be disposed so as to cover the stopper pin 44 from above.

(2c) In the vehicle seat 1 according to the aforementioned embodiment, the shapes of support brackets 55, 56 are merely one example. The shapes of the support brackets 55, 56 and their attachment positions may be optionally modified.

(2d) The vehicle seat 1 according to the aforementioned embodiment may be used for seats for automobiles other than passenger cars, or used for seats for vehicles other than automobiles, such as railroad vehicles, ships, boats, and aircrafts.

(2e) A single function or several functions possessed by a single component in the above-described embodiments may be distributed to several components; a single function or several functions possessed by several components may be integrated and assigned to a single component. A part of the configurations of the above-described embodiments may be omitted. At least a part of the configurations of the above-described embodiments may be added to or altered with the configurations of other embodiments. Various aspects included in the technical ideas specified only by the languages recited in the claims correspond to the embodiments of the present disclosure.

What is claimed is:

1. A vehicle seat comprising:
 a seatback;
 a back frame forming a framework of the seatback; and
 an armrest configured to be pivotable between a stored position in which the armrest is stored in the seatback and an in-use position in which the armrest is folded down toward a front side of the seat,
 wherein the armrest comprises:
   two side frames disposed so as to be spaced apart in a seat width direction; and
   a stopper pin projecting outside from the two side frames in the seat width direction,
 wherein the back frame comprises two support brackets to which the two side frames are respectively pivotably coupled,
 wherein the two support brackets respectively comprise guide slots in which the stopper pin is inserted, the guide slots being configured to guide the stopper pin when the armrest pivots, and
 wherein, on a reference surface that is perpendicular to the seat width direction and defined for each of the two side frames, a locus of one of the guide slots of a corresponding one of the two support brackets is projected, and a shape of a corresponding one of the two side frames and a shape of a portion of the stopper pin inserted into the guide slots are also projected on the reference surface, wherein the locus, as projected on the reference surface, is delineated by the guide slots moving relative to the two side frames when the armrest pivots, and a diameter of a largest perfect circle that can be fitted into any of nonoverlapping areas of the locus that do not overlap with the corresponding one of the two side frames or the stopper pin is smaller than a width of the one of the guide slots.

2. The vehicle seat according to claim 1, wherein at least one of the two side frames comprises: a panel shaped main body; and an auxiliary bracket attached to the main body, and wherein the auxiliary bracket is disposed in a portion of the reference surface where the auxiliary bracket overlaps with the locus.

3. The vehicle seat according to claim 2, wherein the main body comprises: a lateral surface perpendicular to the seat width direction; and an upper surface coupled to the lateral surface in an upper side of the armrest in the in-use position, and wherein the stopper pin is secured to the upper surface of the main body, and wherein the auxiliary bracket is disposed on the upper surface of the main body so as to cover the stopper pin.

4. The vehicle seat according to claim 1, wherein the locus does not have nonoverlapping areas.

5. A vehicle seat comprising:
a seatback;
a back frame forming a framework of the seatback; and
an armrest configured to be pivotable between a stored position in which the armrest is stored in the seatback and an in-use position in which the armrest is folded down toward a front side of the seat,
wherein the armrest comprises:
two side frames disposed so as to be spaced apart in a seat width direction; and
a stopper pin projecting outside from the two side frames in the seat width direction, wherein the back frame comprises two support brackets to which the two side frames are respectively pivotably coupled, wherein the two support brackets respectively comprise guide slots in which the stopper pin is inserted, the guide slots being configured to guide the stopper pin when the armrest pivots, and wherein, on a reference surface that is perpendicular to the seat width direction and defined for each of the two side frames, a locus of one of the guide slots of a corresponding one of the two support brackets is projected, and a shape of a corresponding one of the two side frames and a shape of a portion of the stopper pin inserted into the guide slots are also projected on the reference surface, wherein the locus, as projected on the reference surface, is delineated by the guide slots moving relative to the two side frames when the armrest pivots, and a diameter of a largest perfect circle that can be fitted into nonoverlapping areas of the locus that do not overlap with the corresponding one of the two side frames or the stopper pin is smaller than a width of the one of the guide slots, and at least one of the two side frames comprises:
a panel shaped main body; and an auxiliary bracket attached to the main body, and wherein the auxiliary bracket is plate shaped and is a separate member from the main body.

6. The vehicle seat according to claim 5, wherein the main body comprises: a lateral surface perpendicular to the seat width direction; and an upper surface coupled to the lateral surface in an upper side of the armrest in the in-use position, and wherein the stopper pin is secured to the upper surface of the main body, and wherein the auxiliary bracket is disposed on the upper surface of the main body so as to cover the stopper pin and to cross over the stopper pin in a radial direction of the stopper pin.

7. The vehicle seat according to claim 6, wherein the auxiliary bracket has a though hole for positioning that is provided closer to the back frame than the stopper pin.

* * * * *